United States Patent
Liu et al.

(10) Patent No.: US 11,992,946 B2
(45) Date of Patent: May 28, 2024

(54) REDUNDANT ROBOT JOINT ACCELERATION PLANNING METHOD, REDUNDANT ROBOT USING THE SAME, AND COMPUTER READABLE STORAGE MEDIUM

(71) Applicant: UBTECH ROBOTICS CORP LTD, Shenzhen (CN)

(72) Inventors: Yizhang Liu, Shenzhen (CN); Youjun Xiong, Shenzhen (CN); Xuan Luo, Shenzhen (CN); Xianwen Zeng, Shenzhen (CN); Ligang Ge, Shenzhen (CN); Chunyu Chen, Shenzhen (CN)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 326 days.

(21) Appl. No.: 17/553,758

(22) Filed: Dec. 16, 2021

(65) Prior Publication Data

US 2023/0101489 A1    Mar. 30, 2023

(30) Foreign Application Priority Data

Sep. 27, 2021   (CN) .......................... 202111133210.4

(51) Int. Cl.
    B25J 9/16    (2006.01)
(52) U.S. Cl.
    CPC ........... B25J 9/1651 (2013.01); B25J 9/1607 (2013.01)
(58) Field of Classification Search
    CPC ...... B25J 9/1651; B25J 9/1607; B25J 9/1643; G05B 2219/40519; G05B 2219/40367
    See application file for complete search history.

(56) References Cited

FOREIGN PATENT DOCUMENTS

| CN | 101804627 A | * | 8/2010 | |
|---|---|---|---|---|
| CN | 104157918 A | * | 11/2014 | ........ H01M 10/4207 |
| CN | 108068113 A | * | 5/2018 | ............ B25J 9/1612 |
| CN | 110561440 A | * | 12/2019 | ................ B25J 9/16 |
| CN | 110861088 A | * | 3/2020 | ............ B25J 9/1664 |

OTHER PUBLICATIONS

Zhijun Zhang, Qiongyi Zhou and Weisen Fan, Neural-Dynamic Based Synchronous-Optimization Scheme of Dual Redundant Robot Manipulators, Nov. 8, 2018, frontiers in Neurobotics, pp. 1-18 (Year: 2018).*

* cited by examiner

*Primary Examiner* — Khoi H Tran
*Assistant Examiner* — Dairon Estevez

(57)   ABSTRACT

A joint acceleration planning method, a redundant robot using the same, and a computer readable storage medium are provided. The method includes: obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function.

20 Claims, 3 Drawing Sheets

REDUNDANT ROBOT JOINT ACCELERATION PLANNING METHOD, REDUNDANT ROBOT USING THE SAME, AND COMPUTER READABLE STORAGE MEDIUM

CROSS REFERENCE TO RELATED APPLICATIONS

The present disclosure claims priority to Chinese Patent Application No. 202111133210.4, Sep. 27, 2021, which is hereby incorporated by reference herein as if set forth in its entirety.

BACKGROUND

1. Technical Field

The present disclosure relates to motion planning technology for redundant robot, and particularly to a joint acceleration planning method, a redundant robot using the same, and a computer readable storage medium.

2. Description of Related Art

Redundant robots are being used more and more widely. Redundant robots have multiple degrees of freedom, and achieve various tasks through the coordination of multiple degrees of freedom. The redundant robots have added redundant joints. However, the existing robot control planning methods require very complicated logic processing and classification calculations when dealing with redundant joints, which results in low efficiency in control planning and difficulty in obtaining accurate control planning results.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be understood that, the embodiments described herein are only for explaining the present disclosure, and are not used to limit thereto.

Figure 1:
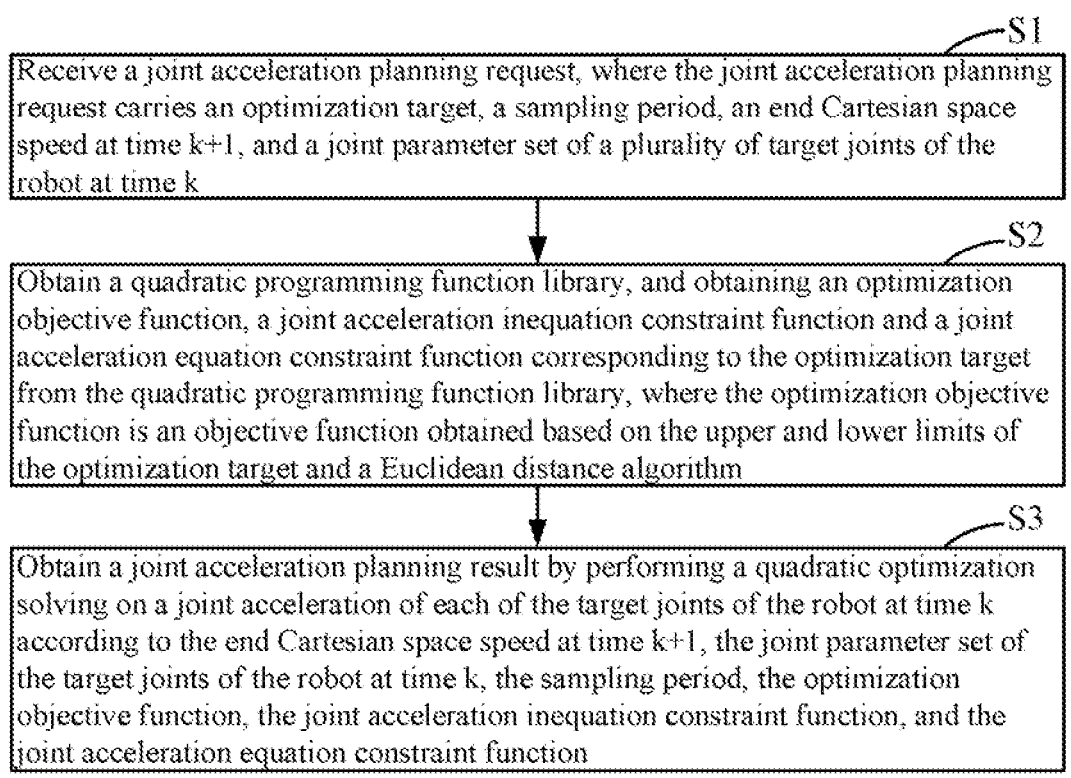
FIG. 1 is a flow chart of a redundant robot joint acceleration planning method according to an embodiment of the present disclosure.

FIG. 1 is a flow chart of a redundant robot joint acceleration planning method according to an embodiment of the present disclosure. A joint acceleration planning method for a redundant robot is provided. In one embodiment, the joint acceleration planning method is a computer-implemented method executable for a processor, which may be applied to the redundant robot. The redundant robot is a robot having more than six degrees of freedom which means that it has additional joint parameters that allow the configuration of the robot to change while it holds its end-effector in a fixed position and orientation. The method may be implemented through a redundant robot joint acceleration planning apparatus shown in FIG. 2 or a redundant robot shown in FIG. 3. As shown in FIG. 1, in this embodiment, the method may include the steps of:

S1: receiving a joint acceleration planning request, where the joint acceleration planning request carries an optimization target, a sampling period, an end Cartesian space speed at time k+1, and a joint parameter set of a plurality of target joints of the robot at time k;

S2: obtaining a quadratic programming function library, and obtaining an optimization objective function, a joint acceleration inequation constraint function and a joint acceleration equation constraint function corresponding to the optimization target from the quadratic programming function library, where the optimization objective function is an objective function obtained based on the upper and lower limits of the optimization target and a Euclidean distance algorithm; and S3: obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function.

In this embodiment, by receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function, it realizes automatically using the joint acceleration as the planning output, so that the optimization target has a large margin of movement while the robot end can maintain the target speed in Cartesian space. In addition, it avoids the need for very complex logic processing and classification calculations when dealing with redundant joints, improves the efficiency of control planning, and improves the accuracy of control planning results.

The redundant robot may be any kind of robot with motion functions, any kind of mobile platform with motion functions, any kind of robot arm with fixed base (e.g., industrial robot arm, collaborative robot arm, and parallel structural robot), a mobile base robot (e.g., wheeled robot, footed robot, and crawler robot), a mobile base robot with robotic arm, and an automotive mobile platform.

In S1, the joint acceleration planning request input by the user or that sent by a third-party application system or by the program for realizing the present disclosure at the sampling period may be obtained.

The joint acceleration planning request is a request for planning the joint acceleration of the redundant robot.

The optimization target is the target that needs to be optimized.

Optionally, the optimization target may be one of joint speed, joint position, joint position and joint speed, and joint angle. In which, "the optimization target is the joint position and joint speed" means that the joint position and the joint speed are used as the optimization target at the same time.

It can be understood that, the optimization target may also be other parameters. For example, the optimization target may be the joint speed and joint angle, which is not limited herein.

The joint speed includes a linear speed and an angular speed.

The joint position includes a linear position and an angular position, where the angular position is just the angle.

The sampling period is just the time interval of sampling, which is a specific value.

The target joint is just the joint of the redundant robot.

The joint parameter set may include a joint speed, a joint position, and a joint angle.

The end Cartesian space speed at time k+1 is the expected speed of the end of the redundant robot in Cartesian space at time k+1. It can be understood that, the end Cartesian space speed at time k+1 is the control target of the redundant robot. In other words, the end Cartesian space speed at time k+1 is the target speed that each target joint of the redundant robot starts to move from time k and needs to reach at time k+1.

In S2, the quadratic programming function library may be obtained from a database or a third-party application system, or obtained through the input by the user.

The quadratic programming function library may include a target, an objective function, an inequality constraint function, and an equality constraint function.

The target may be any of the joint speed, the joint position, the joint position and joint speed, and the joint angle.

In which, the targets of the quadratic programming function library are searched according to the optimization target, and the objective function corresponding to the target that is found from the quadratic programming function library is used as the objective function. The inequality constraint function corresponding to the target found from the quadratic programming function library is used as the joint acceleration inequation constraint function, and the equality constraint function corresponding to the target found from the quadratic programming function library is used as the joint acceleration equality constraint function.

The joint acceleration inequation constraint function is a saturation constraint on the joint acceleration that is determined according to the upper and lower limits (including the upper limit and the lower limit) of the parameters of the redundant joint.

In which, the types of the joints of the redundant robot may include rotation joint and translation joint. The rotational joint generally has angle and angular speed constraints. The translation joint has linear position and linear speed constraints. However, the angle, angular speed, line position, and line speed have different measurement units, and it will be difficult to unify the four constraints to process at the same time. Therefore, in the present disclosure, the objective function obtained based on the upper and lower limits of the optimization target and the Euclidean distance algorithm is used as the optimization objective function, thereby providing a basis for the unified processing of various constraints, and the accuracy of the control planning result is improved.

In one embodiment, an upper and lower limit average value and an upper and lower limit difference value are determined according to the upper and lower limits of the optimization target, then the Euclidean distance between the value of the optimization target at time k and the upper and lower limit average value is calculated based on the upper and lower limit difference value, and finally the objective function is determined according to the Euclidean distance so as to use the determined objective function as the optimization objective function corresponding to the optimization target.

The joint moves toward two directions of the upper limit and the lower limit. When the joint is at the upper and lower limit average value, the joint margin is the largest, and the distance that the joint deviates from the upper and lower limit average value is inversely proportional to the joint margin. In which, the upper limit is added to the lower limit to obtain a summary value, the summary value is divided by 2 to obtain the median value of the motion range, and the median value of the motion range is used as the upper and lower limit average value.

In one embodiment, when the optimization target is the joint speed, the joint acceleration of the i-th target joint at time k is constrained by the upper limit of the joint speed of the i-th target joint, the lower limit of the joint speed of the i-th target joint, the upper limit of the joint acceleration of the i-th target joint, and the lower limit of the joint acceleration of the i-th target joint, and the joint acceleration inequation constraint function is determined according to the constraint.

In one embodiment, when the optimization target is one of a joint position, the joint position and a joint speed, and a joint angle, the joint acceleration of the i-th target joint at time k is constrained by the upper limit of the joint position of the i-th target joint, the lower limit of the joint position of the i-th target joint, the upper limit of the joint speed of the i-th target joint, and the lower limit of the joint speed of the i-th target joint, the upper limit of the joint acceleration of the i-th target joint, and the lower limit of the joint acceleration of the i-th target joint, and the joint acceleration inequation constraint function is determined according to the constraint.

In one embodiment, the joint acceleration equation constraint function is:

$$J(k)a(k) = \frac{(X(k+1) - J(k)v(k))}{T};$$

where, J(k) is the Jacobian matrix at time k, v(k) is the joint speed of each of the target joints at time k, a(k) is the joint acceleration of each of the target joints at time k, T Is the sampling period, and X(k+1) is the end Cartesian space speed at time k+1.

In which, by taking the end Cartesian space speed at time k+1 as the control target for joint acceleration planning at time k, the equation constraint for the redundant robot can be obtained as:

$X = Jv;$ where, X is the end Cartesian space speed, J is the Jacobian matrix, and v is the joint speed of each of the target joints of the redundant robot.

In discrete form, the equation constraint of the redundant robot at time k will be:

$X(k) = J(k)v(k)$

Then, in discrete form, the equality constraint of the redundant robot at time k+1 will be:

$$X(k+1) = J(k+1)v(k+1);$$

$$X(k+1) = \left(J(k) + \frac{\partial J}{\partial t}(k) \cdot T\right) \cdot (v(k) + a(k)T); \text{ and}$$

$$X(k+1) = J(k)(v(k) + a(k)T) + \frac{\partial J}{\partial t}(k) \cdot T \cdot (v(k) + a(k)T);$$

where $$\frac{\partial J}{\partial t}(k)$$

is the derivation calculation of the Jacobian matrix with respect to time at time k, T is the sampling period, v(k) is the joint speed of each of the target joints at time k, and a(k) is the joint acceleration of each of the target joints at time k.

In the equation constraint of the redundant robot at time k+1, when T is small enough, the equation constraint of the redundant robot at time k+1 may be simplified as:

$X(k+1) = J(k)(v(k) + a(k)T).$

According to the simplified equation constraint of the redundant robot at time k+1, it can be determined that:

$$J(k)a(k) = \frac{(X(k+1) - J(k)v(k))}{T};$$

which is used as the joint acceleration equation constraint function.

In S3, the end Cartesian space speed at time k+1, each joint parameter set at time k, and the sampling period are substituted into the optimization objective function, the joint acceleration inequation constraint function, and the joint acceleration equation constraint function to perform the quadratic optimization solving. The quadratic optimization solving will output the optimal joint acceleration of each of the target joints at time k, and the outputted optimal joint acceleration of each of the target joints at time k is taken as the joint acceleration planning result.

In other words, the joint acceleration planning result is the target joint acceleration of each of the target joint at time k.

In one embodiment, after S3 of obtaining the joint acceleration planning result by performing the quadratic optimization solving on the joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function, it further includes: from time k, driving each of the target joints to move according to the joint acceleration planning results so as to achieve the given control target, so that the actual speed of the end of the redundant robot in the Cartesian space at time k+1 can be equal to the end Cartesian space speed at time k+1.

In the actual physical environment, the position and speed of the robot cannot be changed suddenly, while the acceleration of the robot is caused by forces and can be changed suddenly. In other words, the acceleration of the robot can be changed suddenly. It can be understood that, in the present disclosure, acceleration is used as the output of algorithm solving, the first-order integral of acceleration is used as the speed to output, and the first-order integral of speed is used as the position to output, thereby avoiding sudden changes in the output position and speed.

In one embodiment, when the optimization target is the joint speed, the steps of the method for determining the optimization objective function are:

S211: determining the joint speed of the i-th target joint at time k+1 according to the joint speed of the i-th target joint at time k, the joint acceleration of the i-th target joint at time k, and the sampling period;

S212: obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

S213: obtaining a square value of a difference value of the upper and lower limits of the joint speed of the i-th target joint by performing a square calculation on the difference value of the upper and lower limits of the joint speed of the i-th target joint;

S214: obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

S215: obtaining a first objective function by summing the speed Euclidean distance ratios of all the target joints at time k+1; and S216: obtaining the optimized objective function when the optimization target is the joint speed by performing a minimum value solving on the first objective function.

In this embodiment, the Euclidean distance between the actual value of the joint speed and the average value of the upper and lower limits of the joint speed is calculated based on the difference value between the upper and lower limits of the joint speed, and finally the objective function is determined based on the Euclidean distance to use the determined objective function as the optimization objective function corresponding to the joint speed, thereby providing a basis for the unified processing of various constraints, and the accuracy of the control planning result is improved.

Through steps S211 to step S216, the optimization objective function when the optimization target is the joint speed may be calculated through an equation of:

$$\min \sqrt{\sum_{i=1}^{n} \left(\frac{v_i(k) + a_i(k) \cdot T - v_i^M}{v_i^R}\right)^2};$$

where, n is the number of the joints, $v_i(k)$ is the joint speed of the i-th target joint at time k, $a_i(k)$ is the joint acceleration of the i-th target joint at time k, T is the sampling period, $v_i^M$ is the average value of the upper and lower limits of the joint speed of the i-th target joint, and $v_i^R$ is the difference value between the upper and lower limits of the joint speed of the i-th target joint.

In which, the average values of the upper limit of the joint speed of the i-th target joint and the lower limit of the joint speed of the i-th target joint are calculated, and the calculated average values are used as the average value of the upper and lower limits of the joint speed of the i-th target joint.

In which, the upper limit of the joint speed of the i-th target joint is subtracted from the lower limit of the joint speed of the i-th target joint, and the result of the subtraction is used as the difference of the upper and lower limits of the joint speed of the i-th target joint.

In one embodiment, when the optimization target is the joint speed, the joint acceleration of the i-th target joint at time k is constrained by the upper limit of the joint speed of the i-th target joint, the lower limit of the joint speed of the i-th target joint, the upper limit of the joint acceleration of the i-th target joint, and the lower limit of the joint acceleration of the i-th target joint;

the joint acceleration inequation constraint function when the optimization target is the joint speed is:

$$\max\left(\frac{(v_i^{min} - v_i(k))}{T}, a_i^{min}\right) \le a_i(k) \le \min\left(\frac{(v_i^{max} - v_i(k))}{T}, a_i^{max}\right);$$

where, $v_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $v_i(k)$ is the joint speed of the i-th target joint at time k, $a_i(k)$ is the joint acceleration of the i-th target joint at time k, and T is the sampling period.

In this embodiment, when using the joint speed as the optimization target is realized, the joint acceleration inequation constraint function is determined according to the upper and lower limits of the joint speed and that of the joint acceleration, thereby realizing constraining the joint acceleration according to the output torque of the single joint and the joint speed.

In which, because the output torque of the single joint of the redundant robot is limited, there is the constraint relationship of:

$a_i^{min} \le a_i(k) \le a_i^{max}$.

Because each joint of the redundant robot has speed constraints, the joint speed of the i-th target joint at time k+1 has the constraint relationship of:

$v_i^{min} \le v_i(k) + a_i(k) \cdot T \le v_i^{max}$;

and it can obtain that:

$$\frac{(v_i^{min} - v_i(k))}{T} \le a_i(k) \le \frac{(v_i^{max} - v_i(k))}{T}.$$

Finally, according to the constraint relationship $a_i^{min} \le a_i(k) \le a_i^{max}$ and the constraint relationship $$\frac{(v_i^{min} - v_i(k))}{T} \le a_i(k) \le \frac{(v_i^{min} - v_i(k))}{T},$$

the joint acceleration inequation constraint function when the optimization target is the joint speed can be determined as:

$$\max\left(\frac{(v_i^{min} - v_i(k))}{T}, a_i^{min}\right) \le a_i(k) \le \min\left(\frac{(v_i^{min} - v_i(k))}{T}, a_i^{max}\right).$$

In one embodiment, when the optimization target is the joint position, the steps for determining the optimization objective function may include:

S221: determining the joint position of the i-th target joint at time k+1 according to the joint position of the i-th target joint at time k, the joint speed of the i-th target joint at time k, the joint acceleration of the i-th target joint at time k, and the sampling period;

S222: obtaining a position Euclidean distance of the i-th target joint at time k+1 by performing a Euclidean distance calculation on a difference value between the joint position of the i-th target joint at time k+1 and upper and lower limits of the joint position of the i-th target joint;

S223: obtaining a square value of an average value of the upper and lower limits of the joint position of the i-th target joint by performing a squaring calculation on an average value of the upper and lower limits of the joint position of the i-th target join;

S224: obtaining a position Euclidean distance ratio of the i-th target joint at time k+1 by dividing the position Euclidean distance of the i-th target joint at time k+1 by the square value of the average value of the upper and lower limits of the joint position of the i-th target joint;

S225: obtaining a second objective function by summing the position Euclidean distance ratios of all the target joints at time k+1; and S226: obtaining the optimized objective function when the optimization target is the joint position by performing a minimum value solving on the second objective function.

In this embodiment, the Euclidean distance between the actual value of the joint position and the average value of the upper and lower limits of the joint position is calculated based on the difference value between the upper and lower limits of the joint position, and finally the objective function is determined according to the Euclidean distance to use the determined objective function as the optimization objective function corresponding to the joint position, thereby providing a basis for the unified processing of various constraints, and the accuracy of the control planning result is improved.

Through step S221 to step S226, the optimization objective function obtained when the optimization target is the joint position may be calculated through an equation of:

$$\min \sqrt{\sum_{i=1}^{n} \left(\frac{d_i(k) + v_i(k) \cdot T + 0.5 \times a_i(k) \times T^2 - d_i^M}{d_i^R}\right)^2};$$

where, n is the number of the joints, $d_i(k)$ is the joint position of the i-th target joint at time k, $v_i(k)$ is the joint speed of the i-th target joint at time k, $a_i(k)$ is the joint acceleration of the i-th target joint at time k, T is the sampling period, $d_i^M$ is the difference value between the upper and lower limits of the joint position of the i-th target joint, and $d_i^R$ is the average value of the upper and lower limits of the joint position of the i-th target joint.

In which, the average value of the upper limit of the joint position of the i-th target joint and the lower limit of the joint position of the i-th target joint is calculated, and the calculated average value is used as the average value of the upper and lower limits of the joint position of the i-th target joint In which, the upper limit of the joint position of the i-th target joint is subtracted from the lower limit of the joint position of the i-th target joint, and result of the subtraction is used as the difference of the upper and lower limits of the joint position of the i-th target joint.

In one embodiment, when the above-mentioned optimization target is the joint position and joint speed, the steps for determining the optimization objective function may include:

S231: determining the joint position of the i-th target joint at time k+1 according to the joint position of the i-th target joint at time k, the joint speed of the i-th target joint at time k, the joint acceleration of the i-th target joint at time k, and the sampling period;

S232: obtaining a position Euclidean distance of the i-th target joint at time k+1 by performing a Euclidean distance calculation on a difference value between the joint position of the i-th target joint at time k+1 and upper and lower limits of the joint position of the i-th target joint;

S233: obtaining a square value of an average value of the upper and lower limits of the joint position of the i-th target joint by performing a squaring calculation on an average value of the upper and lower limits of the joint position of the i-th target join;

S234: obtaining a position Euclidean distance ratio of the i-th target joint at time k+1 by dividing the position Euclidean distance of the i-th target joint at time k+1 by the square value of the average value of the upper and lower limits of the joint position of the i-th target joint;

S235: obtaining a third objective function by summing the position Euclidean distance ratios of all the target joints at time k+1;

S236: determining the joint speed of the i-th target joint at time k+1 according to the joint speed of the i-th target joint at time k, the joint acceleration of the i-th target joint at time k, and the sampling period;

S237: obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

S238: obtaining a square value of a difference value of the upper and lower limits of the joint speed of the i-th target joint by performing a square calculation on the difference value of the upper and lower limits of the joint speed of the i-th target joint;

S239: obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

S2310: obtaining a fourth objective function by summing the speed Euclidean distance ratios of all the target joints at time k+1;

S2311: obtaining a fifth objective function by calculating a weighted sum of the third objective function and the fourth objective function; and S2312: obtaining the optimized objective function when the optimization target is the joint position and joint speed by performing a minimum value solving on the fifth objective function.

In this embodiment, the Euclidean distance between the actual value of the joint position and the average value of the upper and lower limits of the joint position is calculated based on the difference of the upper and lower limits of the joint position first, then the third objective function is determined based on the Euclidean distance, and then the Euclidean distance between the actual value of the joint speed and the average value of the upper and lower limits of the joint speed is calculated based on the difference value of the upper and lower limits of the joint speed, and finally the fourth objective function is determined based on the Euclidean distance, and a weighted summation is performed on the third objective function and the fourth objective function to use as the joint position for using as the optimization objective function corresponding to the optimization target together with the joint speed, thereby providing a basis for the unified processing of various constraints, and the accuracy of the control planning result is improved.

Through S231 to step S2312, when the optimization target is the joint position and joint speed, the optimization objective function may be calculated through an equation of:

$$\min\left(\sqrt{\sum_{k=1}^{n}\left(\frac{d_i(k) + v_i(k)\cdot T + 0.5\times a_i(k)\times T^2 - d_i^M}{d_i^R}\right)^2} + \alpha*\sqrt{\sum_{k=1}^{n}\left(\frac{v_i(k) + a_i(k)\cdot T - v_i^M}{v_i^R}\right)^2}\right);$$

where, n is the number of the joints, $d_i(k)$ is the joint position of the i-th target joint at time k, $v_i(k)$ is the joint speed of the i-th target joint at time k, $a_i(k)$ is the joint acceleration of the i-th target joint at time k, T is the sampling period, $d_i^M$ is the average value between the upper and lower limits of the joint position of the i-th target joint, and $d_i^R$ is the difference value of the upper and lower limits of the joint position of the i-th target joint, a is a constant, $v_i^M$ is the average value of the upper and lower limits of the joint speed of the i-th target joint, and $v_i^R$ is the difference value between the upper and lower limits of the joint speed of the i-th target joint value.

In one embodiment, when the optimization target is the joint angle, the steps for determining the optimization objective function may include:

S241: obtaining a joint angle change speed of the i-th target joint at time k by performing a joint angle change speed calculation according to the joint speed of the i-th target joint at time k;

S242: obtaining a joint angle change acceleration of the i-th target joint at time k by performing a joint angle change acceleration calculation according to the joint acceleration of the i-th target joint at time k;

S243: determining the joint angle of the i-th target joint at time k+1 according to the joint angle of the i-th target joint at time k, the joint angle change speed of the i-th target joint at time k, and the joint angle change acceleration of the i-th target joint at time k, and the sampling period;

S244: obtaining an angular Euclidean distance of the i-th target joint is at time k+1 by performing a Euclidean distance calculation on the joint angle of the i-th target joint at time k+1 and an average value of upper and lower limits of the joint angle of the i-th target joint;

S245: obtaining a square value of a difference value between the upper and lower limits of the joint angle of the i-th target joint by performing a square calculation on the difference value of the upper and lower limits of the joint angle of the i-th target joint;

S246: obtaining an angular Euclidean distance ratio of the i-th target joint at time k+1 by dividing the angular Euclidean distance of the i-th target joint at time k+1 by the square value of the difference value between the upper and lower limits of the joint angle of the i-th target joint;

S247: obtaining a fifth objective function by summing the angular Euclidean distance ratios of all the target joints at time k+1; and S248: obtaining the optimized objective function when the optimization target is the joint angle by performing a minimum value solving on the fifth objective function.

In this embodiment, based on the difference value between the upper and lower limits of the joint angle, the Euclidean distance between the actual value of the joint angle and the average value of the upper and lower limits of the joint angle is calculated, and finally the objective function is determined according to the Euclidean distance to use the determined objective function as the optimization objective function corresponding to the joint angle, thereby providing a basis for the unified processing of various constraints, and the accuracy of the control planning result is improved.

In S241, the kinematics principle may be used to calculate the joint angle change speed according to the joint speed of the i-th target joint at time k, and the specific steps will not be repeated herein.

In S242, the kinematics principle may be used to calculate the joint angle change acceleration based on the joint acceleration of the i-th target joint at time k, and the specific steps will not be not repeated herein.

Through step S243 to step S248, the optimization objective function when the optimization target is the joint angle may be calculated through an equation of:

$$\min \sqrt{\sum_{i=1}^{n} \left( \frac{\theta_i(k) + v_i^\theta(k) \cdot T + 0.5 \times a_i^\theta(k) \times T^2 - \theta_i^M}{\theta_i^R} \right)^2 };$$

where, n is the number of the joints, $\theta_i(k)$ is the joint angle of the i-th target joint at time k, $v_i^\theta(k)$ is the joint angle change speed of the i-th target joint at time k, $a_i^\theta(k)$ is the joint angle change acceleration of the i-th target joint at time k, T is the sampling period, $\theta_i^M$ is the average value of the upper and lower limits of the joint angle of the i-th target joint, and $\theta_i^R$ is the difference value between the upper and lower limits of the joint angle of the i-th target joint.

In which, the average value of the upper limit of the joint angle of the i-th target joint and the lower limit of the joint angle of the i-th target joint is calculated, and the calculated average value is used as the average value of the upper and lower limits of the joint angle of the i-th target joint.

In which, the upper limit of the joint angle of the i-th target joint is subtracted from the lower limit of the joint angle of the i-th target joint, and the result of the subtraction is used as the difference of the upper and lower limits of the joint angle of the i-th target joint.

In one embodiment, when the optimization target is any of the joint position, the joint position and joint speed, and joint angle, the joint acceleration of the i-th target joint at time k is constrained by the upper limit of the joint position of the i-th target joint, the lower limit of the joint position of the i-th target joint, the upper limit of the joint speed of the i-th target joint, the lower limit of the joint speed of the i-th target joint, the upper limit of the joint acceleration of the i-th target joint, and the lower limit of the joint acceleration of the i-th target joint;

The joint acceleration inequation constraint function when the optimization target is any of the joint position, the joint position and joint speed, and the joint angle is: 甲, $$\max\left( \frac{2(d_i^{min} - (d_i(k) + v_i(k) \cdot T))}{T^2}, \frac{(v_i^{min} - v_i(k))}{T}, a_i^{min} \right) \leq$$

$$a_i(k) \leq \min\left( \frac{2(d_i^{max} - (d_i(k) + v_i(k) \cdot T))}{T^2}, \frac{(v_i^{max} - v_i(k))}{T}, a_i^{max} \right);$$

where, $d_i^{max}$ is the upper limit of the joint position of the i-th target joint, $d_i^{min}$ is the lower limit of the joint position of the i-th target joint, and $v_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $d_i(k)$ is the joint position of the i-th target joint at time k, $v_i(k)$ is the joint speed of the i-th target joint at time k, and $a_i(k)$ is the joint acceleration of the i-th target joint at time k.

In this embodiment, the joint acceleration inequation constraint when any of the joint position, the joint position and joint speed, and the joint angle is used as the optimization target is determined according to the upper and lower limits of the joint position, the upper and lower limits of the joint speed, and the upper and lower limits of the joint acceleration, thereby realizing the constraint of joint acceleration based on the joint position, the output torque of the single joint, and the joint speed.

In which, because the output torque of the single joint of the redundant robot is limited, there is the constraint relationship of:

$$a_i^{min} \leq a_i(k) \leq a_i^{max}.$$

Because each of the joints of the redundant robot has speed constraints, the joint speed of the i-th target joint at time k+1 has the constraint relationship of:

$$v_i^{min} \leq v_i(k) + a_i(k) \cdot T \leq v_i^{max};$$

and it can obtain that:

$$\frac{(v_i^{min} - v_i(k))}{T} \leq a_i(k) \leq \frac{(v_i^{max} - v_i(k))}{T}.$$

Because each of the joints of the redundant robot has position constraints, the joint position of the i-th target joint at time k+1 has the constraint relationship of:

$$d_i^{min} \leq d_i(k) + v_i(k) \cdot T + 0.5 \times a_i(k) \times T^2 \leq d_i^{max};$$

and it can obtain that $$\frac{2(d_i^{min} - (d_i(k) + v_i(k) \cdot T))}{T^2} \leq a_i(k) \leq \frac{2(d_i^{max} - (d_i(k) + v_i(k) \cdot T))}{T^2}.$$

Finally, according to the constraint relationship of $$a_i^{min} \leq a_i(k) \leq a_i^{max}, \frac{(v_i^{min} - v_i(k))}{T} \leq a_i(k) \leq \frac{(v_i^{max} - v_i(k))}{T}, \text{ and}$$

$$\frac{2(d_i^{min} - (d_i(k) + v_i(k) \cdot T))}{T^2} \leq a_i(k) \leq \frac{2(d_i^{max} - (d_i(k) + v_i(k) \cdot T))}{T^2},$$

the joint acceleration inequation constraint function when the optimization target is the joint speed may be determined as:

$$\max\left(\frac{2(d_i^{min} - (d_i(k) + v_i(k) \cdot T))}{T^2}, \frac{(v_i^{min} - v_i(k))}{T}, a_i^{min}\right) \leq$$

$$a_i(k) \leq \min\left(\frac{2(d_i^{max} - (d_i(k) + v_i(k) \cdot T))}{T^2}, \frac{(v_i^{max} - v_i(k))}{T}, a_i^{max}\right) \quad \text{i.}$$

Figure 2:
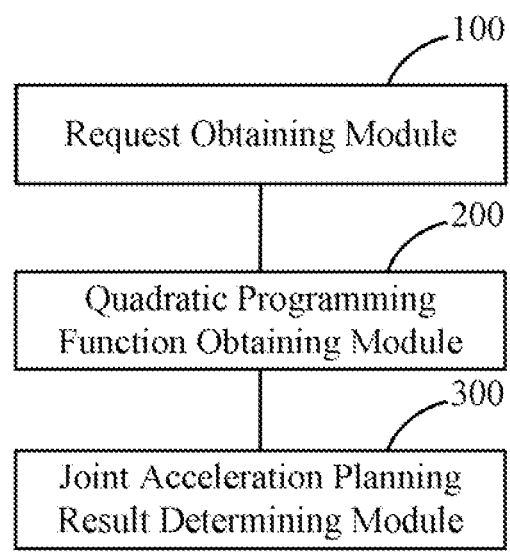
FIG. 2 is a schematic block diagram of the structure of a redundant robot joint acceleration planning apparatus according to an embodiment of the present disclosure.

FIG. 2 is a schematic block diagram of the structure of a redundant robot joint acceleration planning apparatus according to an embodiment of the present disclosure. A joint acceleration planning apparatus for a redundant robot is provided. In one embodiment, the joint acceleration planning apparatus may be applied to the above-mentioned redundant robot (e.g., the redundant robot shown in FIG. 3). As shown in FIG. 2, in this embodiment, the apparatus may include:

a request obtaining module 100 configured to receive a joint acceleration planning request, where the joint acceleration planning request carries an optimization target, a sampling period, an end Cartesian space speed at time k+1, and a joint parameter set of a plurality of target joints of the robot at time k;

a quadratic programming function obtaining module 200 configured to obtain a quadratic programming function library, and obtain an optimization objective function, a joint acceleration inequation constraint function and a joint acceleration equation constraint function corresponding to the optimization target from the quadratic programming function library, where the optimization objective function is an objective function obtained based on the upper and lower limits of the optimization target and a Euclidean distance algorithm; and a joint acceleration planning result determining module 300 configured to obtain a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function.

In this embodiment, by receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function, it realizes automatically using the joint acceleration as the planning output, so that the optimization target has a large margin of movement while the robot end can maintain the target speed in Cartesian space. In addition, it avoids the need for very complex logic processing and classification calculations when dealing with redundant joints, improves the efficiency of control planning, and improves the accuracy of control planning results.

Figure 3:
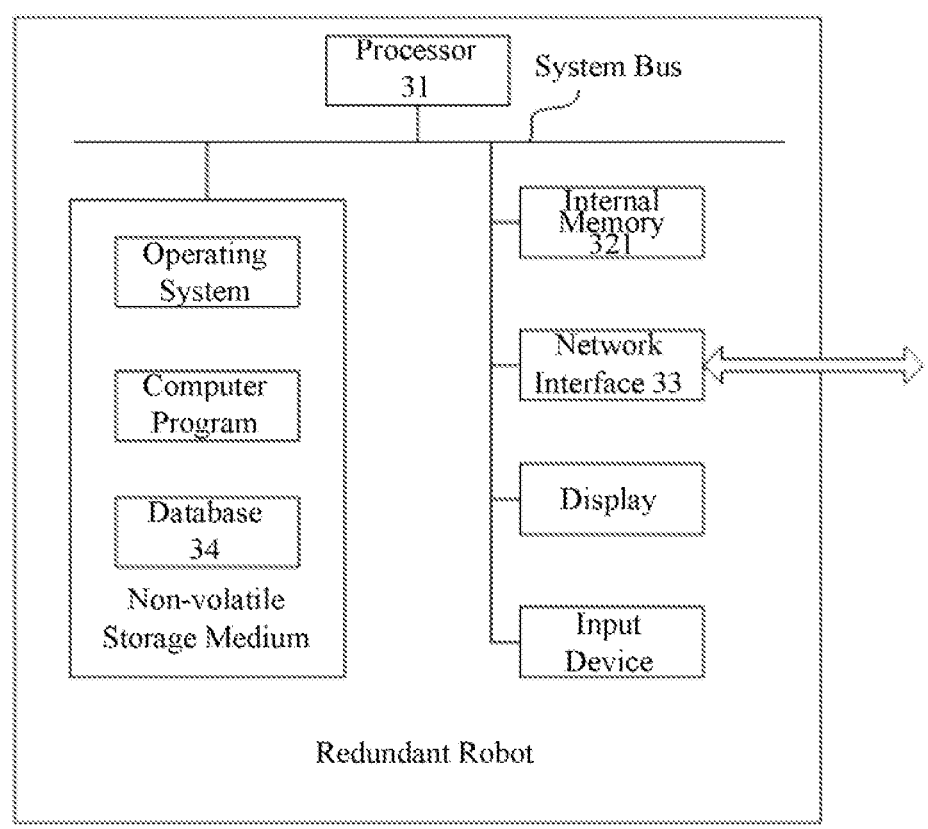
FIG. 3 is a schematic block diagram of the structure of a redundant robot according to an embodiment of the present disclosure.

FIG. 3 is a schematic block diagram of the structure of a redundant robot according to an embodiment of the present disclosure. A redundant robot is provided. In one embodiment, the redundant robot may be a server, and its hardware structure may be as shown in FIG. 3. As shown in FIG. 3, the redundant robot includes a processor 31, a storage, a network interface 33, and a database 34 which are connected via a system bus. In which, the processor 31 is for realizing calculations and controls. The storage includes a non-volatile storage medium and an internal memory 321. The non-volatile storage medium stores an operating system, a computer program, and the database 34. The internal memory 321 provides an environment for the execution of the operating system and computer program in the non-volatile storage medium. The database 34 is for storing the redundant robot joint acceleration planning method and other data. The network interface 33 is for connecting and communicating with an external terminal via a network. When the computer program is executed by the processor 31, the above-mentioned redundant robot joint acceleration planning method is implemented. The redundant robot joint acceleration planning method includes: receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function.

In this embodiment, by receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function, it realizes automatically using the joint acceleration as the planning output, so that the optimization target has a large margin of movement while the robot end can maintain the target speed in Cartesian space. In addition, it avoids the need for very complex logic processing and classification calculations when dealing with redundant joints, improves the efficiency of control planning, and improves the accuracy of control planning results.

In one embodiment, a non-transitory computer readable storage medium is provided, where a computer program is stored thereon. When the computer program is executed by a processor, a redundant robot joint acceleration planning method is implemented. The method includes the steps of: receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function.

In the above-mentioned redundant robot joint acceleration planning method to be executed, by receiving a joint acceleration planning request, where the joint acceleration planning request carries an optimization target, a sampling period, an end Cartesian space speed at time k+1, and a joint parameter set of a plurality of target joints of the robot at time k first; then obtaining an optimization objective function, a joint acceleration inequation constraint function and a joint acceleration equation constraint function corresponding to the optimization target from a quadratic programming function library, where the optimization objective function is an objective function obtained based on the upper and lower limits of the optimization target and a Euclidean distance algorithm; and then obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function, it realizes automatically using the joint acceleration as the planning output, so that the optimization target has a large margin of movement while the robot end can maintain the target speed in Cartesian space. In addition, it avoids the need for very complex logic processing and classification calculations when dealing with redundant joints, improves the efficiency of control planning, and improves the accuracy of control planning results.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

It should be noted that, in the present disclosure, the terms "including", "comprising", and their variations are intended to represent non-exclusive inclusion, so that a process, apparatus (or device), article or method including a series of elements not only includes those elements, but also includes other elements not explicitly listed or the elements inherent to the process, apparatus, article, or method. In the case of without specific designation, the element defined by the sentence "including a . . . " does not exclude other identical elements in the process, apparatus, article, or method that includes the element.

The forgoing is only the embodiments of the present disclosure which do not limit the scope of the present disclosure. Any equivalent structure or equivalent process transformation made by using the content of the description and drawings of the present disclosure, or direct or indirect application to other related technical field is equally included in the scope of the patent protection of the present disclosure.

What is claimed is:

1. A computer-implemented joint acceleration planning method for a redundant robot, comprising:

receiving a joint acceleration planning request, wherein the joint acceleration planning request carries an optimization target, a sampling period, an end Cartesian space speed at time k+1, and a joint parameter set of a plurality of target joints of the robot at time k;

obtaining a quadratic programming function library, and obtaining an optimization objective function, a joint acceleration inequation constraint function and a joint acceleration equation constraint function corresponding to the optimization target from the quadratic programming function library, wherein the optimization objective function is an objective function obtained based on the upper and lower limits of the optimization target and a Euclidean distance algorithm; and obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function;

wherein when the optimization target is a joint speed, the optimization objective function is determined by:

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a first objective function by summing the speed Euclidean distance ratios of all the target joints at time k+1; and obtaining the optimized objective function when the optimization target is the joint speed by performing a minimum value solving on the first objective function.

2. The method of claim 1, wherein when the optimization target is the joint speed, the joint acceleration of the i-th target joint at time k is constrained by the upper limit of the joint speed of the i-th target joint, the lower limit of the joint speed of the i-th target joint, the upper limit of the joint acceleration of the i-th target joint, and the lower limit of the joint acceleration of the i-th target joint;

the joint acceleration inequation constraint function when the optimization target is the joint speed is:

$$\max\left(\frac{(v_i^{min} - v_i(k))}{T}, a_i^{min}\right) \leq a_i(k) \leq \min\left(\frac{(v_i^{min} - v_i(k))}{T}, a_i^{max}\right);$$

where, $V_i^{max}$ is the upper limit of the joint speed of the i-th target joint, $V_i^{min}$ is the lower limit of the joint speed of the i-th target joint, $a_i^{max}$ is the upper limit of the joint acceleration of the i-th target joint, $a_i^{min}$ is the lower limit of the joint acceleration if the i-th target joint, $V_i(k)$ is the joint speed of the i-th target joint at time k, $a_i(k)$ is the joint acceleration of the i-th target joint at time k, and T is the sampling period.

3. The method of claim 1, wherein when the optimization target is a joint position, the optimization objective function is determined by:

determining the joint position of the i-th target joint at time k+1 according to the joint position of the i-th target joint at time k, the joint speed of the i-th target joint at time k, the joint acceleration of the i-th target joint at time k, and the sampling period;

obtaining a position Euclidean distance of the i-th target joint at time k+1 by performing a Euclidean distance calculation on a difference value between the joint position of the i-th target joint at time k+1 and upper and lower limits of the joint position of the i-th target joint;

obtaining a square value of an average value of the upper and lower limits of the joint position of the i-th target joint by performing a squaring calculation on an average value of the upper and lower limits of the joint position of the i-th target join;

obtaining a position Euclidean distance ratio of the i-th target joint at time k+1 by dividing the position Euclidean distance of the i-th target joint at time k+1 by the square value of the average value of the upper and lower limits of the joint position of the i-th target joint;

obtaining a second objective function by summing the position Euclidean distance ratios of all the target joints at time k+1; and obtaining the optimized objective function when the optimization target is the joint position by performing a minimum value solving on the second objective function.

4. The method of claim 1, wherein when the optimization target is a joint position and a joint speed, the optimization objective function is determined by:

determining the joint position of the i-th target joint at time k+1 according to the joint position of the i-th target joint at time k, the joint speed of the i-th target joint at time k, the joint acceleration of the i-th target joint at time k, and the sampling period;

obtaining a position Euclidean distance of the i-th target joint at time k+1 by performing a Euclidean distance calculation on a difference value between the joint position of the i-th target joint at time k+1 and upper and lower limits of the joint position of the i-th target joint;

obtaining a square value of an average value of the upper and lower limits of the joint position of the i-th target joint by performing a squaring calculation on an average value of the upper and lower limits of the joint position of the i-th target join;

obtaining a position Euclidean distance ratio of the i-th target joint at time k+1 by dividing the position Euclidean distance of the i-th target joint at time k+1 by the square value of the average value of the upper and lower limits of the joint position of the i-th target joint;

obtaining a third objective function by summing the position Euclidean distance ratios of all the target joints at time k+1;

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a fourth objective function by summing the speed Euclidean distance ratios of all the target joints at time k+1;

obtaining a fifth objective function by calculating a weighted sum of the third objective function and the fourth objective function; and obtaining the optimized objective function when the optimization target is the joint position and joint speed by performing a minimum value solving on the fifth objective function.

5. The method of claim 1, wherein when the optimization target is a joint angle, the optimization objective function is determined by:

obtaining a joint angle change speed of the i-th target joint at time k by performing a joint angle change speed calculation according to the joint speed of the i-th target joint at time k;

obtaining a joint angle change acceleration of the i-th target joint at time k by performing a joint angle change acceleration calculation according to the joint acceleration of the i-th target joint at time k;

determining the joint angle of the i-th target joint at time k+1 according to the joint angle of the i-th target joint at time k, the joint angle change speed of the i-th target joint at time k, and the joint angle change acceleration of the i-th target joint at time k, and the sampling period;

obtaining an angular Euclidean distance of the i-th target joint is at time k+1 by performing a Euclidean distance calculation on the joint angle of the i-th target joint at time k+1 and an average value of upper and lower limits of the joint angle of the i-th target joint;

obtaining a square value of a difference value between the upper and lower limits of the joint angle of the i-th target joint by performing a square calculation on the difference value of the upper and lower limits of the joint angle of the i-th target joint;

obtaining an angular Euclidean distance ratio of the i-th target joint at time k+1 by dividing the angular Euclidean distance of the i-th target joint at time k+1 by the square value of the difference value between the upper and lower limits of the joint angle of the i-th target joint;

obtaining a fifth objective function by summing the angular Euclidean distance ratios of all the target joints at time k+1; and obtaining the optimized objective function when the optimization target is the joint angle by performing a minimum value solving on the fifth objective function.

6. The method of claim 1, wherein when the optimization target is one of a joint position, the joint position and a joint speed, and a joint angle, the joint acceleration of the i-th target joint at time k is constrained by the upper limit of the joint position of the i-th target joint, the lower limit of the joint position of the i-th target joint, the upper limit of the joint speed of the i-th target joint, and the lower limit of the joint speed of the i-th target joint, the upper limit of the joint acceleration of the i-th target joint, and the lower limit of the joint acceleration of the i-th target joint;

the joint acceleration inequation constraint function when the optimization target is one of the joint position, the joint position and joint speed, and the joint angle is:

$$\max\left(\frac{2(d_i^{min} - (d_i(k) + v_i(k) \cdot T))}{T^2}, \frac{(v_i^{min} - v_i(k))}{T}, a_i^{min}\right) \leq$$
$$a_i(k) \leq \min\left(\frac{2(d_i^{max} - (d_i(k) + v_i(k) \cdot T))}{T^2}, \frac{(v_i^{max} - v_i(k))}{T}, a_i^{max}\right);$$

where, $d_i^{max}$ is the upper limit of the joint position of the i-th target joint, $d_i^{min}$ is the lower limit of the joint position of the i-th target joint, $v_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $d_i(k)$ is the joint position of the i-th target joint at time k, $v_i(k)$ is the joint speed of the i-th target joint at time k, $a_i(k)$ is the joint acceleration of the i-th target joint at time k, and T is the sampling period.

7. A redundant robot, comprising:
a processor;
a memory coupled to the processor; and
one or more computer programs stored in the memory and executable on the processor;
wherein, the one or more computer programs comprise:
instructions for receiving a joint acceleration planning request, wherein the joint acceleration planning request carries an optimization target, a sampling period, an end Cartesian space speed at time k+1, and a joint parameter set of a plurality of target joints of the robot at time k;
instructions for obtaining a quadratic programming function library, and obtaining an optimization objective function, a joint acceleration inequation constraint function and a joint acceleration equation constraint function corresponding to the optimization target from the quadratic programming function library, wherein the optimization objective function is an objective function obtained based on the upper and lower limits of the optimization target and a Euclidean distance algorithm; and
instructions for obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function;

wherein when the optimization target is a joint position, the optimization objective function is determined by:
determining the joint position of the i-th target joint at time k+1 according to the joint position of the i-th target joint at time k, the joint speed of the i-th target joint at time k, the joint acceleration of the i-th target joint at time k, and the sampling period;
obtaining a position Euclidean distance of the i-th target joint at time k+1 by performing a Euclidean distance calculation on a difference value between the joint position of the i-th target joint at time k+1 and upper and lower limits of the joint position of the i-th target joint;
obtaining a square value of an average value of the upper and lower limits of the joint position of the i-th target joint by performing a squaring calculation on an average value of the upper and lower limits of the joint position of the i-th target join;
obtaining a position Euclidean distance ratio of the i-th target joint at time k+1 by dividing the position Euclidean distance of the i-th target joint at time k+1 by the square value of the average value of the upper and lower limits of the joint position of the i-th target joint;
obtaining a second objective function by summing the position Euclidean distance ratios of all the target joints at time k+1; and
obtaining the optimized objective function when the optimization target is the joint position by performing a minimum value solving on the second objective function.

8. The redundant robot of claim 7, wherein when the optimization target is a joint speed, the optimization objective function is determined by:

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a first objective function by summing the speed Euclidean distance ratios of all the target joints at time k+1; and obtaining the optimized objective function when the optimization target is the joint speed by performing a minimum value solving on the first objective function.

9. The redundant robot of claim 8, wherein when the optimization target is the joint speed, the joint acceleration of the i-th target joint at time k is constrained by the upper limit of the joint speed of the i-th target joint, the lower limit of the joint speed of the i-th target joint, the upper limit of the joint acceleration of the i-th target joint, and the lower limit of the joint acceleration of the i-th target joint;

the joint acceleration inequation constraint function when the optimization target is the joint speed is:

$$\max\left(\frac{(v_i^{min} - v_i(k))}{T}, a_i^{min}\right) \le a_i(k) \le \min\left(\frac{(v_i^{min} - v_i(k))}{T}, a_i^{max}\right);$$

where, $v_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $v_i(k)$ is the joint speed of the i-th target joint at time k, $a_i(k)$ is the joint acceleration of the i-th target joint at time k, and T is the sampling period.

10. The redundant robot of claim 7, wherein when the optimization target is a joint position and a joint speed, the optimization objective function is determined by:

determining the joint position of the i-th target joint at time k+1 according to the joint position of the i-th target joint at time k, the joint speed of the i-th target joint at time k, the joint acceleration of the i-th target joint at time k, and the sampling period;

obtaining a position Euclidean distance of the i-th target joint at time k+1 by performing a Euclidean distance calculation on a difference value between the joint position of the i-th target joint at time k+1 and upper and lower limits of the joint position of the i-th target joint;

obtaining a square value of an average value of the upper and lower limits of the joint position of the i-th target joint by performing a squaring calculation on an average value of the upper and lower limits of the joint position of the i-th target join;

obtaining a position Euclidean distance ratio of the i-th target joint at time k+1 by dividing the position Euclidean distance of the i-th target joint at time k+1 by the square value of the average value of the upper and lower limits of the joint position of the i-th target joint;

obtaining a third objective function by summing the position Euclidean distance ratios of all the target joints at time k+1;

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a fourth objective function by summing the speed Euclidean distance ratios of all the target joints at time k+1;

obtaining a fifth objective function by calculating a weighted sum of the third objective function and the fourth objective function; and obtaining the optimized objective function when the optimization target is the joint position and joint speed by performing a minimum value solving on the fifth objective function.

11. The redundant robot of claim 7, wherein when the optimization target is a joint angle, the optimization objective function is determined by:

obtaining a joint angle change speed of the i-th target joint at time k by performing a joint angle change speed calculation according to the joint speed of the i-th target joint at time k;

obtaining a joint angle change acceleration of the i-th target joint at time k by performing a joint angle change acceleration calculation according to the joint acceleration of the i-th target joint at time k;

determining the joint angle of the i-th target joint at time k+1 according to the joint angle of the i-th target joint at time k, the joint angle change speed of the i-th target joint at time k, and the joint angle change acceleration of the i-th target joint at time k, and the sampling period;

obtaining an angular Euclidean distance of the i-th target joint is at time k+1 by performing a Euclidean distance calculation on the joint angle of the i-th target joint at time k+1 and an average value of upper and lower limits of the joint angle of the i-th target joint;

obtaining a square value of a difference value between the upper and lower limits of the joint angle of the i-th target joint by performing a square calculation on the difference value of the upper and lower limits of the joint angle of the i-th target joint;

obtaining an angular Euclidean distance ratio of the i-th target joint at time k+1 by dividing the angular Euclidean distance of the i-th target joint at time k+1 by the square value of the difference value between the upper and lower limits of the joint angle of the i-th target joint;

obtaining a fifth objective function by summing the angular Euclidean distance ratios of all the target joints at time k+1; and obtaining the optimized objective function when the optimization target is the joint angle by performing a minimum value solving on the fifth objective function.

12. The redundant robot of claim 7, wherein when the optimization target is one of a joint position, the joint position and a joint speed, and a joint angle, the joint acceleration of the i-th target joint at time k is constrained by the upper limit of the joint position of the i-th target joint, the lower limit of the joint position of the i-th target joint, the upper limit of the joint speed of the i-th target joint, and the lower limit of the joint speed of the i-th target joint, the upper limit of the joint acceleration of the i-th target joint, and the lower limit of the joint acceleration of the i-th target joint;

the joint acceleration inequation constraint function when the optimization target is one of the joint position, the joint position and joint speed, and the joint angle is:

$$\max\left(\frac{2(d_i^{min} - (d_i(k) + v_i(k) \cdot T))}{T^2}, \frac{(v_i^{min} - v_i(k))}{T}, a_i^{min}\right) \leq$$

$$a_i(k) \leq \min\left(\frac{2(d_i^{max} - (d_i(k) + v_i(k) \cdot T))}{T^2}, \frac{(v_i^{max} - v_i(k))}{T}, a_i^{max}\right);$$

where, $d_i^{max}$ is the upper limit of the joint position of the i-th target joint, $d_i^{min}$ is the lower limit of the joint position of the i-th target joint, $V_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $d_i(k)$ is the joint position of the i-th target joint at time k, $v_i(k)$ is the joint speed of the i-th target joint at time k, $a_i(k)$ is the joint acceleration of the i-th target joint at time k, and T is the sampling period.

13. A non-transitory computer readable storage medium for storing one or more computer programs, wherein the one or more computer programs comprise:

instructions for receiving a joint acceleration planning request, wherein the joint acceleration planning request carries an optimization target, a sampling period, an end Cartesian space speed at time k+1, and a joint parameter set of a plurality of target joints of the robot at time k;

instructions for obtaining a quadratic programming function library, and obtaining an optimization objective function, a joint acceleration inequation constraint function and a joint acceleration equation constraint function corresponding to the optimization target from the quadratic programming function library, wherein the optimization objective function is an objective function obtained based on the upper and lower limits of the optimization target and a Euclidean distance algorithm; and instructions for obtaining a joint acceleration planning result by performing a quadratic optimization solving on a joint acceleration of each of the target joints of the robot at time k according to the end Cartesian space speed at time k+1, the joint parameter set of the target joints of the robot at time k, the sampling period, the optimization objective function, the joint acceleration inequation constraint function, and the joint acceleration equation constraint function;

wherein when the optimization target is a joint angle, the optimization objective function is determined by:

obtaining a joint angle change speed of the i-th target joint at time k by performing a joint angle change speed calculation according to the joint speed of the i-th target joint at time k;

obtaining a joint angle change acceleration of the i-th target joint at time k by performing a joint angle change acceleration calculation according to the joint acceleration of the i-th target joint at time k;

determining the joint angle of the i-th target joint at time k+1 according to the joint angle of the i-th target joint at time k, the joint angle change speed of the i-th target joint at time k, and the joint angle change acceleration of the i-th target joint at time k, and the sampling period;

obtaining an angular Euclidean distance of the i-th target joint is at time k+1 by performing a Euclidean distance calculation on the joint angle of the i-th target joint at time k+1 and an average value of upper and lower limits of the joint angle of the i-th target joint;

obtaining a square value of a difference value between the upper and lower limits of the joint angle of the i-th target joint by performing a square calculation on the difference value of the upper and lower limits of the joint angle of the i-th target joint;

obtaining an angular Euclidean distance ratio of the i-th target joint at time k+1 by dividing the angular Euclidean distance of the i-th target joint at time k+1 by the square value of the difference value between the upper and lower limits of the joint angle of the i-th target joint;

obtaining a fifth objective function by summing the angular Euclidean distance ratios of all the target joints at time k+1; and obtaining the optimized objective function when the optimization target is the joint angle by performing a minimum value solving on the fifth objective function.

14. The storage medium of claim 13, wherein when the optimization target is a joint speed, the optimization objective function is determined by:

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a first objective function by summing the speed Euclidean distance ratios of all the target joints at time k+1; and obtaining the optimized objective function when the optimization target is the joint speed by performing a minimum value solving on the first objective function.

15. The storage medium of claim 14, wherein when the optimization target is the joint speed, the joint acceleration of the i-th target joint at time k is constrained by the upper limit of the joint speed of the i-th target joint, the lower limit of the joint speed of the i-th target joint, the upper limit of the joint acceleration of the i-th target joint, and the lower limit of the joint acceleration of the i-th target joint;

the joint acceleration inequation constraint function when the optimization target is the joint speed is:

$$\max\left(\frac{(v_i^{min} - v_i(k))}{T}, a_i^{min}\right) \le a_i(k) \le \min\left(\frac{(v_i^{min} - v_i(k))}{T}, a_i^{max}\right);$$

where, $V_1^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $v_i(k)$ is the joint speed of the i-th target joint at time k, $a_i(k)$ is the joint acceleration of the i-th target joint at time k, and T is the sampling period.

16. The storage medium of claim 13, wherein when the optimization target is a joint position, the optimization objective function is determined by:

determining the joint position of the i-th target joint at time k+1 according to the joint position of the i-th target joint at time k, the joint speed of the i-th target joint at time k, the joint acceleration of the i-th target joint at time k, and the sampling period;

obtaining a position Euclidean distance of the i-th target joint at time k+1 by performing a Euclidean distance calculation on a difference value between the joint position of the i-th target joint at time k+1 and upper and lower limits of the joint position of the i-th target joint;

obtaining a square value of an average value of the upper and lower limits of the joint position of the i-th target joint by performing a squaring calculation on an average value of the upper and lower limits of the joint position of the i-th target join;

obtaining a position Euclidean distance ratio of the i-th target joint at time k+1 by dividing the position Euclidean distance of the i-th target joint at time k+1 by the square value of the average value of the upper and lower limits of the joint position of the i-th target joint;

obtaining a second objective function by summing the position Euclidean distance ratios of all the target joints at time k+1; and obtaining the optimized objective function when the optimization target is the joint position by performing a minimum value solving on the second objective function.

17. The storage medium of claim 13, wherein when the optimization target is a joint position and a joint speed, the optimization objective function is determined by:

determining the joint position of the i-th target joint at time k+1 according to the joint position of the i-th target joint at time k, the joint speed of the i-th target joint at time k, the joint acceleration of the i-th target joint at time k, and the sampling period;

obtaining a position Euclidean distance of the i-th target joint at time k+1 by performing a Euclidean distance calculation on a difference value between the joint position of the i-th target joint at time k+1 and upper and lower limits of the joint position of the i-th target joint;

obtaining a square value of an average value of the upper and lower limits of the joint position of the i-th target joint by performing a squaring calculation on an average value of the upper and lower limits of the joint position of the i-th target join;

obtaining a position Euclidean distance ratio of the i-th target joint at time k+1 by dividing the position Euclidean distance of the i-th target joint at time k+1 by the square value of the average value of the upper and lower limits of the joint position of the i-th target joint;

obtaining a third objective function by summing the position Euclidean distance ratios of all the target joints at time k+1;

determining the joint speed of the i-th target joint at time k+1 according to the joint speed of the i-th target joint at time k, the joint acceleration of the i-th target joint at time k, and the sampling period;

obtaining a speed Euclidean distance of the i-th target joint at time k+1 by performing a Euclidean distance calculation on the joint speed of the i-th target joint at time k+1 and an average value of upper and lower limits of the joint speed of the i-th target joint;

obtaining a square value of a difference value of the upper and lower limits of the joint speed of the i-th target joint by performing a square calculation on the difference value of the upper and lower limits of the joint speed of the i-th target joint;

obtaining a speed Euclidean distance ratio of the i-th target joint at time k+1 by dividing the speed Euclidean distance of the i-th target joint at time k+1 by the square value of the difference value of the upper and lower limits of the joint speed of the i-th target joint;

obtaining a fourth objective function by summing the speed Euclidean distance ratios of all the target joints at time k+1;

obtaining a fifth objective function by calculating a weighted sum of the third objective function and the fourth objective function; and obtaining the optimized objective function when the optimization target is the joint position and joint speed by performing a minimum value solving on the fifth objective function.

18. The storage medium of claim 13, wherein wherein when the optimization target is one of a joint position, the joint position and a joint speed, and a joint angle, the joint acceleration of the i-th target joint at time k is constrained by the upper limit of the joint position of the i-th target joint, the lower limit of the joint position of the i-th target joint, the upper limit of the joint speed of the i-th target joint, and the lower limit of the joint speed of the i-th target joint, the upper limit of the joint acceleration of the i-th target joint, and the lower limit of the joint acceleration of the i-th target joint;

the joint acceleration inequation constraint function when the optimization target is one of the joint position, the joint position and joint speed, and the joint angle is:

$$\max\left(\frac{2(d_i^{min} - (d_i(k) + v_i(k) \cdot T))}{T^2}, \frac{(v_i^{min} - v_i(k))}{T}, a_i^{min}\right) \le$$

-continued $$a_i(k) \leq \min\left(\frac{2(d_i^{max} - (d_i(k) + v_i(k) \cdot T))}{T^2}, \frac{(v_i^{max} - v_i(k))}{T}, a_i^{max}\right);$$

where, $d_i^{max}$ is the upper limit of the joint position of the i-th target joint, $d_i^{min}$ is the lower limit of the joint position of the i-th target joint, $v_i^{max}$ is the upper limit of the joint speed of the i-th target joint, $v_i^{min}$ is the lower limit of the joint speed of the i-th target joint, $a_i^{max}$ is the upper limit of the joint acceleration of the i-th target joint, $a_i^{min}$ is the lower limit of the joint acceleration of the i-th target joint, $d_i(k)$ is the joint position of the i-th target joint at time k, $v_i(k)$ is the joint speed of the i-th target joint at time k, $a_i(k)$ is the joint acceleration of the i-th target joint at time k, and T is the sampling period.

19. The storage medium of claim 13, wherein the joint acceleration planning request is inputted by the user; or
the joint acceleration planning request is sent by a third-party application system, or by a program at the sampling period.

20. The storage medium of claim 13, wherein the optimization target is a joint speed and a joint angle.

\* \* \* \* \*